United States Patent [19]

Nealon et al.

[11] Patent Number: 5,463,659
[45] Date of Patent: Oct. 31, 1995

[54] APPARATUS AND METHOD OF CONFIGURING A CORDLESS TELEPHONE FOR OPERATING IN A FREQUENCY HOPPING SYSTEM

[75] Inventors: William J. Nealon, Neptune City; Heidi A. Rajan, Morganville, both of N.J.

[73] Assignee: AT&T IPM Corp., Coral Gables, Fla.

[21] Appl. No.: 333,681

[22] Filed: Nov. 3, 1994

Related U.S. Application Data

[63] Continuation-in-part of Ser. No. 270,348, Jul. 5, 1994.
[51] Int. Cl.⁶ .................................................. H04B 1/713
[52] U.S. Cl. ...................................... 375/202; 380/48
[58] Field of Search .................................. 375/202, 200; 380/48

[56] References Cited

U.S. PATENT DOCUMENTS

| | | | |
|---|---|---|---|
| 4,850,036 | 8/1987 | Smith | 455/179 |
| 5,323,447 | 11/1991 | Gillis et al. | 379/61 |
| 5,325,420 | 9/1992 | Kikuchi | 379/61 |
| 5,353,341 | 10/1991 | Gillis et al. | 379/61 |
| 5,396,541 | 3/1995 | Farwell et al. | 375/202 |

Primary Examiner—David C. Cain
Attorney, Agent, or Firm—Samuel R. Williamson

[57] ABSTRACT

A cordless telephone arranged for operation in a frequency hopping system includes multiple portable units configured for operation with a base unit and with each other by having the base unit pseudo randomly select from a plurality of communication channels available in the frequency hopping system a different starting channel for each one of the portable units. Each portable unit then provides initial communications with the base unit over the selected starting channel of the portable unit. For maintaining communications during a frequency hopping cycle between a portable unit and the base unit, the portable unit and base unit both generate a set of communication channels from the starting channel assigned to the portable unit for subsequent use in communicating over the radio frequency link. Each of the portable units is configured for operation with the base unit and with each other during a registration procedure. Information indicative of the starting channel for each portable unit and also a security code is transmitted to each of the portable units from the base unit during this registration procedure and on a predetermined communication channel at a radiated energy level well below the level normally used for normal communications.

15 Claims, 7 Drawing Sheets

APPARATUS AND METHOD OF CONFIGURING A CORDLESS TELEPHONE FOR OPERATING IN A FREQUENCY HOPPING SYSTEM

CROSS-REFERENCE TO RELATED APPLICATION

This application is a continuation-in-part of application Ser. No. 08/270,348, filed on Jul. 5, 1994, pending.

BACKGROUND OF THE INVENTION

1. Technical Field

This invention relates to cordless telephones and, more particularly, to a cordless telephone having a plurality of portable units arranged for communicating with a base unit in a frequency hopping system.

2. Description of the Prior Art

Recent rulings promulgated by the FCC in the utilization of spread spectrum systems, including a frequency hopping system, now allow suppliers to produce improved cordless telephones which provide users much greater freedom and mobility than is available with conventional cordless telephones. Frequency hopping systems spread their energy by changing, or hopping the center frequency of the transmission many times a second in accordance with a pseudo-randomly generated list of communication channels. The result is a significantly higher signal to noise ratio than may be achieved by conventional techniques such as amplitude modulation that uses no bandwidth spreading.

These improved cordless telephones provide security naturally from an eavesdropper listening in on a conversation simply because of the spread spectrum/frequency hopping transmission technique employed by these telephones. Examples of such improved cordless telephones are described in U.S. Pat. No. 5,323,447 which issued to M. E. Gillis et al. on Jun. 21, 1994 and U.S. Pat. No. 5,353,341 which issued to M. E. Gillis et al. on Oct. 4, 1994. Although these improved cordless telephones give users much more freedom and mobility than conventional cordless telephones, they do not readily permit communications between multiple portable units and a single base unit and also between multiple portable units. As a result, each of multiple cordless telephone portable units are unable to share a common telephone line without having a respectively associated base unit.

SUMMARY OF THE INVENTION

In accordance with the invention, a cordless telephone arranged for operation in a frequency hopping system includes an arrangement which achieves optimum utilization of multiple cordless telephone portable units by permitting these units to access a common base unit and also access each other.

In accordance with a first aspect of the invention, the portable units are configured for operation with the base unit and with each other by having the base unit pseudo-randomly select from a plurality of communication channels available in the frequency hopping system a different starting channel for each one of the portable units. For maintaining communications between a portable unit and the base unit during a frequency hopping cycle, both the portable unit and base unit generate a set of communication channels from the selected starting channel assigned to the portable unit for subsequent use over the radio frequency link.

In accordance with a second aspect of the invention, information indicative of the starting channel for each portable unit and also a security code is transmitted to each of the portable units from the base unit during a registration process and on a predetermined communication channel at a radiated energy level well below the level normally used for normal communications. Thus security of this information is assured.

BRIEF DESCRIPTION OF THE DRAWINGS

The invention and its mode of operation will be more clearly understood from the following detailed description when read with the appended drawing in which.

DETAILED DESCRIPTION

Figure 1:
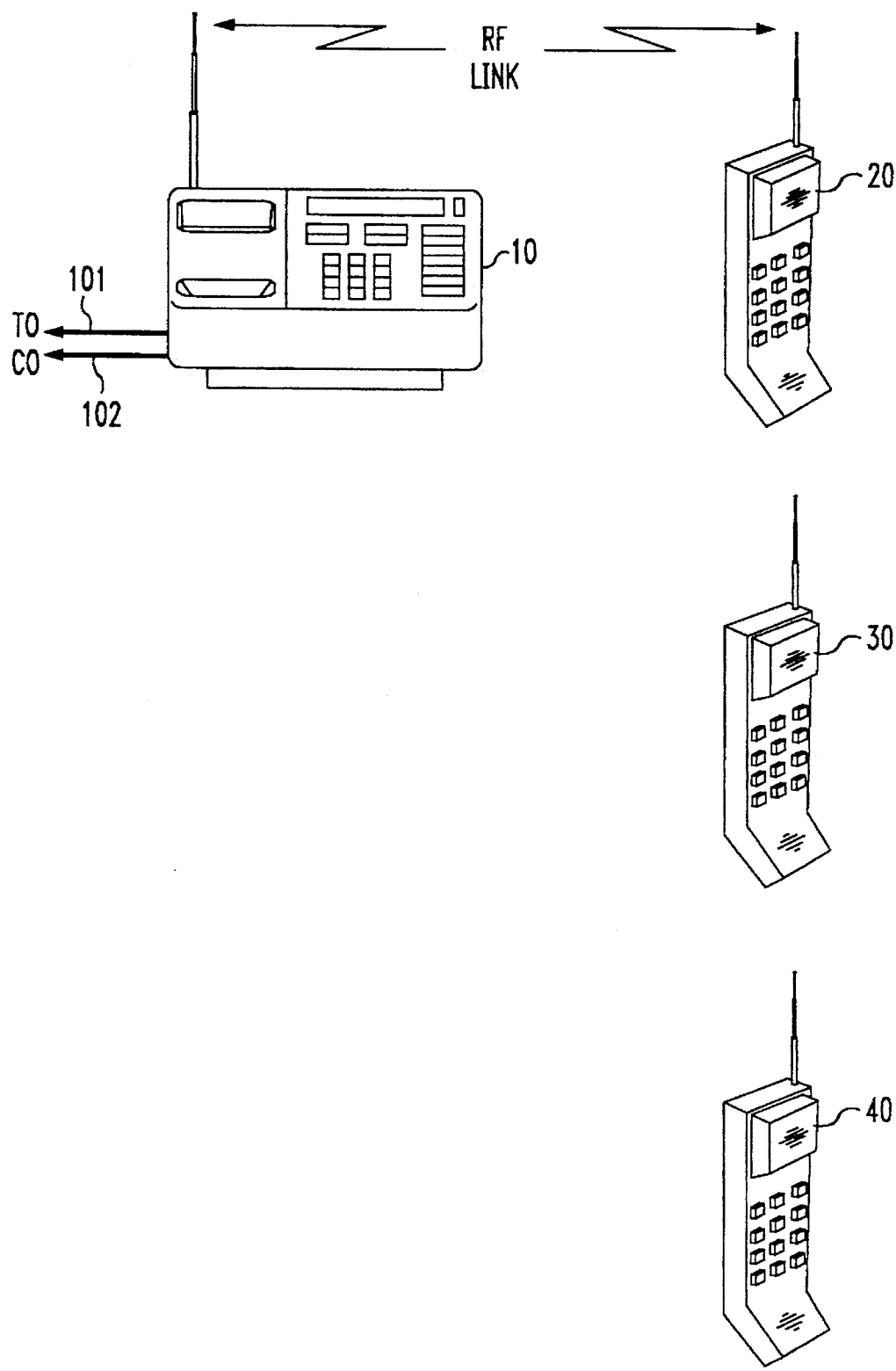
FIG. 1 shows a cordless telephone base unit and multiple portable units for communicating with the base unit.

Referring now to FIG. 1 of the drawing, there is shown a cordless telephone base unit 10 which provides access to a telephone central office (not shown) over tip-ring lines 101–102, and multiple portable or handset units 20 through 40. Although only three handset units are shown and described herein, it is to be understood that a greater or fewer number of handset units may be employed in practicing the principles of this invention.

In accordance with the disclosed embodiment, each of the handset units 20 through 40 may securely access the base unit 10 and share a common telephone line through this base unit. Although an RF link is shown as existing only between base unit 10 and handset unit 20, such RF link may be established between the base unit and any of the handset units 20, 30 or 40. Thus, incoming telephone calls received at the base unit 10 from the central office may be answered by a person at either of the handsets 20 through 40. Similarly, a user of either of the handset units 20 through 40 may originate a call to go over the tip-ring lines 101–102 to the central office.

Also, in accordance with the disclosed embodiment, each of the handset units 20 through 40 may independently communicate with each other as well as the base unit 10, as described in detail later herein. By way of example, handset 20 may be communicating with handset 30 while handset unit 40 is communicating with the base unit 10.

Figure 2:
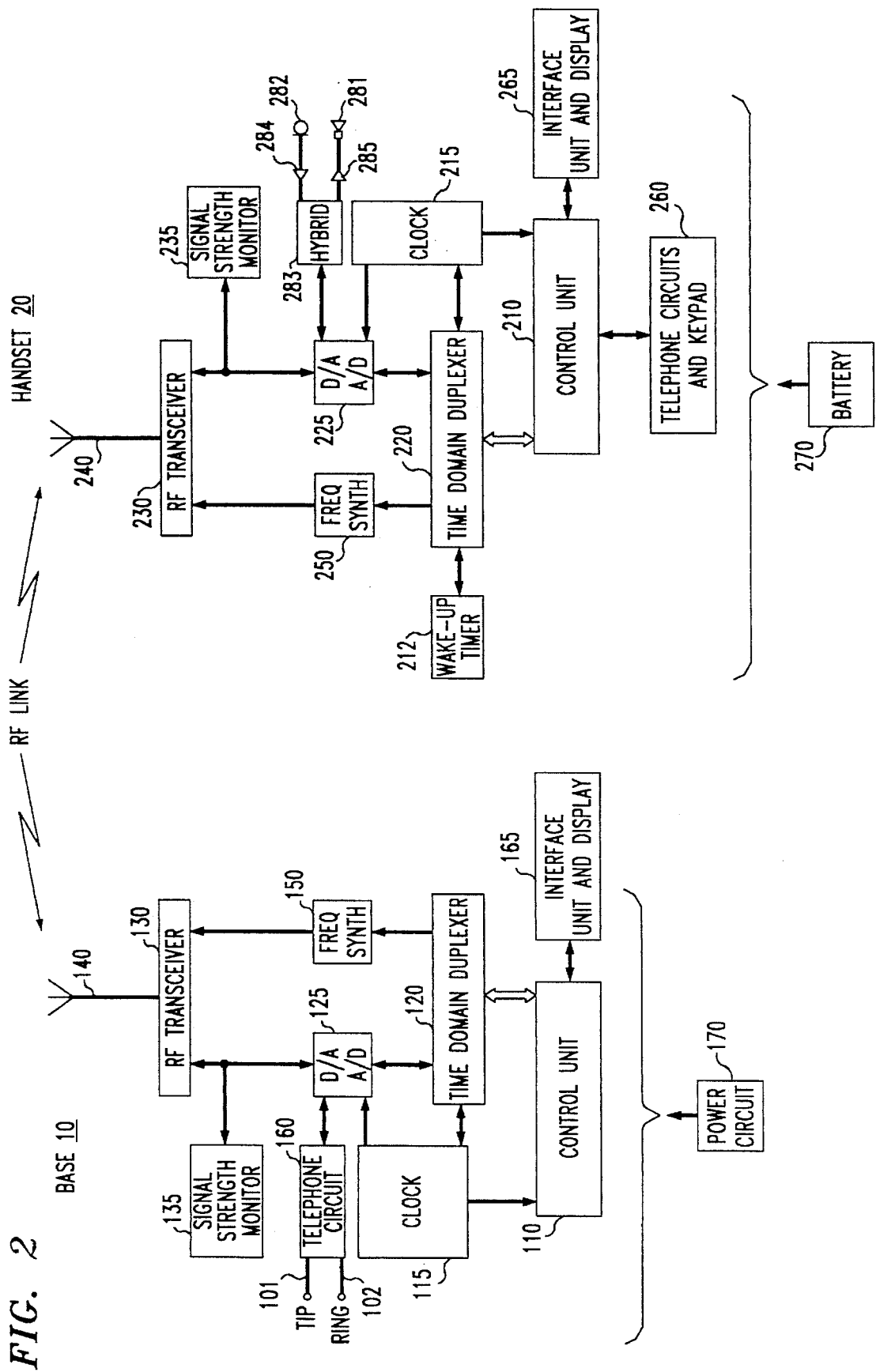
FIG. 2 is a functional block representation of a cordless telephone base unit and portable unit both operative in accordance with the principles of the present invention.

Referring next to FIG. 2 of the drawing, there is shown a general block diagram of certain circuitry of the cordless telephone base unit 10 and of the cordless telephone handset unit 20. With regard to the functional components illustratively described in handset unit 20, handset units 30 and 40 incorporate these same components and are operation ally identical. Both base unit 10 and handset unit 20 are operable over a plurality of communication channels in a frequency hopping system.

A general overview of spread spectrum technology including frequency hopping systems is provided by R. C. Dixon, *Spread Spectrum Systems*, New York: John Wiley & Sons, 1984. The specific requirements for the frequency hopping system in which this cordless telephone is designed to operate are set forth in a Report and Order in General Docket No. 89-354, this Report and Order being adopted by the Federal Communications Commission on Jun. 14, 1990 and released on Jul. 9, 1990.

Included in the base unit 10 are a control unit 110, a clock 115 for providing synchronization to: 1) the control unit 110, 2) a time domain duplexer (TDD) 120 and 3) a combined digital-to-analog and analog-to-digital (D/A+A/D) converter 125. Also included in the base unit 10 is a radio frequency (RF) transceiver 130, a signal strength monitor circuit 135, an antenna 140 and a frequency synthesizer 150. A telephone circuit 160 in the base unit 10 connects this unit to a central office or other appropriate switch through tip and ring lines 101 and 102. An interface unit and display 165 contains the switches and a visual display for configuring the base unit in its various modes for communicating with one of more of the handset units 20 through 40. The transceiver 130 comprise both an RF transmitter and an RF receiver. The transceiver 130 demodulates voice signals transmitted by the handset unit 20 and couples these signals via the D/A section of converter 125 to the telephone circuit 160. The transceiver 130 also has as its input speech and other control signals from the telephone circuit 160 which are first coupled through the A/D section of converter 125 before being transmitted to the handset unit 20 by this transceiver 130. The telephone circuit 160 serves as a "plain old telephone service" (POTS) interface for signals on the tip-ring lines 101 and 102 and for those signals received from the handset unit 20 by the RF transceiver 130. Finally a power circuit 170 provides operating power for all of the circuitry in the base unit 10.

The control unit 110 advantageously provides a number of control functions and may be implemented through the use of a microcomputer containing read-only-memory (ROM), random-access-memory (RAM) and through use of the proper coding. Such a microcomputer is known in the art and is readily available from semiconductor manufacturers such as Motorola, Signetics, Intel and AMD. For example, a microcomputer available from Motorola as part number 6805C4 is usable as control unit 110 with the proper programming. A time division duplexer suitable for use as TDD 120 is available from AT&T Microelectronics as part number 1000DD.

The control unit 110 generates and stores security code data and also generates pseudo-random seeds from which pseudo-random data lists are generated. Assembly language code for generating such a list in the 6805C4 microcomputer is provided in Appendix 1. It is to be understood that random data lists also may be generated in a pseudo-random manner in accordance with the teaching of S. W. Golomb in *Digital Communications With Space Applications* (New Jersey: Prentice-Hall 1964) pp. 7–15.

In accordance with the illustrative disclosed embodiment described herein, four pseudo-random data lists are generated. The first generated list is for the base unit 10 and has a group of 173 data values which correspond to a first set of 173 random channels. The second generated list is for handset unit 20 having a second group of 52 data values which correspond to a second set of 52 random channels. The third generated list is for handset unit 30 having a third group of 52 data values which correspond to a third set of 52 random channels. And a fourth generated list is for handset unit 40 having a fourth group of 52 data values which correspond to a fourth set of 52 random channels. All channels are selected from 173 possible channels available in the 902–928 MHz frequency band. The first set of 173 random channels is used by the base unit 10 for establishing communications with one of the three handset units. These channels are selected during a frequency hopping cycle executed in accordance with the Federal Communication Commission's General Docket No. 89-354. The second, third and fourth sets of 52 random channels are respectively used during a frequency hopping cycle executed by an associated handset also in accordance with the Federal Communication Commission's General Docket No. 89-354. Two of the 52 random channels, channels 51 and 52 selected for each handset, are used during an initialization process described in detail later herein.

The control unit 110 also generates yet another set of data values from a random number seed. This set of data values, typically 10, corresponds to a set of 10 random channels. These channels also are part of the 173 channels available in the 902–928 MHz frequency band. If interference is detected by the base unit or the handset unit with which it is communicating on any one of the second, third or fourth set of channels in a frequency hopping cycle, the affected unit initiates a channel change process whereby one or more channels are selected from this group of random channels for substitution for the channel or channels in the second, third or fourth set of channels upon which the interference was detected. As described later herein, when a handset unit serves as a base unit in establishing communications with another handset unit, then the control unit of the handset unit serving as the base unit takes on the role of generating this extra set of data values and communicating a data value to the handset unit with which it is communicating when a channel substitution becomes necessary, because of, for example, detected interference on a channel.

The control unit 110 controls and configures the TDD 120. The pseudo-randomly generated data list from the control unit 110 is provided to the TDD where it is stored therein. The TDD 120, in turn, controls the frequencies selected in the frequency hopping cycle of the base unit 10 by inputting into the frequency synthesizer 150 at the appropriate time the values stored in the data list generated by the control unit 110. The TDD 120 also refreshes the frequency synthesizer 150 as the synthesizer progresses though the frequency hopping cycle.

In order for the base unit 10 to achieve effective coverage throughout its operating range, the signal strength monitor circuit 135 continually monitors the strength of the received signal from the handset unit 20 during ongoing communications with the handset unit 20. This signal strength monitor circuit 135 may be, for example, a received signal strength indicator (RSSI) circuit. This RSSI circuit produces an output voltage that is proportional to the strength of the received signal from the handset unit 20.

Responsive to the strength of the received signal from the handset unit 20, as determined by the signal strength monitor circuit 135, the control unit 110 regulates the amount of power transmitted by the transmitter in the RF transceiver 130 to the handset unit 20. Thus, when the handset unit 20 is in close proximity to the base unit 10, the level of power radiated by the RF transceiver 130 is reduced to a minimum acceptable level. And when the handset unit 20 is determined to be located near the fringe of the telephone's operating range, the level of power radiated by RF transceiver 130 is increased to its maximum permitted level.

Referring next to the handset unit 20, components in this unit include a control unit 210, a wake-up timer 212 and a clock 215 for providing synchronization to: 1) the control unit 210, 2) a time domain duplexer (TDD) 220 and 3) a combined digital-to-analog and analog-to-digital (D/A+A/D) converter 225. Also included in the handset unit 20 are an RF transceiver 230, a signal strength monitor circuit 235, an antenna 240 and a frequency synthesizer 250. A telephone circuits and keypad section 260 permits dialing telephone digits and selecting such functions as talk, intercom and page modes for the handset unit 20 to communicate with the base unit 10. An interface unit and display 265 contains switches and a visual display for configuring the handset unit 20 in an appropriate mode for communicating with the base unit 10. A battery 270 provides operating power for all the circuitry in the handset unit 20. This battery is charged by the power circuit 170 via a charge contact interface (not shown) formed when the handset unit 20 is placed in a mating cradle of either the base unit 10 or an auxiliary base unit cradle which has no communication capability. A charge contact interface usable between base unit 10 and handset unit 20 is described in U.S. Pat. No. 5,323,447 which issued to M. E. Gillis et al. on Jun. 21, 1994. As earlier indicated herein, handset units 30 and 40 contain the same components that are in handset unit 20 and are operationally identical.

The transceiver 230 comprises both an RF transmitter and an RF receiver. This transceiver 230 demodulates voice signals transmitted by the base unit 10 and couples these signals via the D/A section of converter 225, a hybrid 283, and an amplifier 285 on to a loudspeaker 281. The transceiver 230 also has as its input analog speech signals from a microphone 282 which it transmits to the base unit 10. These analog speech signals are coupled to the transceiver via an amplifier 284, the hybrid 283 and the A/D section of converter 225. This converter converts the analog signal to a digital signal which is then provided to the RF transceiver 230. The signal strength monitor 235 monitors the received signal level from the base unit 10 and accordingly varies the level of the output power radiated by the RF transceiver 230 in proportion to this received signal level.

Any communications between the base unit 10 and the handset unit 20 must be accompanied by a security code then shared between them. During the establishing of initial communications between the handset unit 20 and the base unit 10 initiated by the base unit 10, the control unit 210 must be able to make a favorable comparison of the received security code data with its stored security code data. Similarly, a favorable comparison of the data from the two security codes also must be made by control unit 110 in order for the base unit 10 to respond to a call set-up request from a handset unit. Like the control unit 110, the control unit 210 may be implemented through the use of a microcomputer containing ROM, RAM and through use of the proper coding. Such a microcomputer is known in the art and is readily available from semiconductor manufacturers such as Motorola, Signetics, Intel and AMD. For example, a microcomputer available from Motorola as part number 6805C4 is usable as control unit 210. A time division duplexer suitable for use as TDD 220 is available from AT&T Microelectronics as part number 1000DD.

While the handset unit 20 is not being used for communications and is located remote from the base unit 10, the handset unit 20 enters a low power monitoring mode which includes powering down and then powering up certain minimum circuitry in the handset unit 20 as necessary for satisfactory operation. Reducing the on-time state of this circuitry aids in conserving battery power when no communications are in progress between the handset unit and the base unit. Also, other circuitry in the handset unit 20 is turned completely off while the handset unit is in this monitoring mode. In powering down the handset unit 20, the control unit 210 turns itself off or puts itself to sleep and signals the TDD 220 also to turn off while in the powered down state. Before turning off, the TDD 220 activates wake-up timer 212, which comprises, for example a one-shot-monostable-multivibrator, and turns off all other clock-driven circuitry in the handset unit 20. After approximately 360 milliseconds, the handset unit 20 is powered up into a minimum power operating state for 40 milliseconds. This change of state is initiated by a pulse provided to the TDD 220 from wake-up timer 212 at the end of the 360 milliseconds. The TDD 220 is enabled thereby and, in turn, turns on the control unit 210, the clock 215 and the receiver portion of the transceiver 230 for determining if an RF signal is being transmitted from the base unit 10 or if a key has been pushed on the keypad in the interface unit and display 265. If neither of these has occurred, the control unit 210 again turns off power to itself and to the TDD 220, and the cycle is repeated. This low power monitoring mode continues as long as an RF signal is not received from the base unit 10 or a key has not been pushed on the keypad.

When an RF signal is received from a base unit, this signal is coupled to the control unit 210 which looks for an initialization synchronization (sync) pattern in the signal within the 40 milliseconds that the handset unit is powered up to its minimum power operating state. If the received initialization sync pattern does not contain the security code that is recognized by the handset unit, the control unit 210 turns off power to itself and to the TDD 220. If the initialization sync pattern does contains the security code that is recognized by the handset unit, however, the control unit 210 causes the low power monitoring mode to be overridden. In so doing, the control unit 210 continues to enable the TDD 220 beyond its normal ON time in order to establish synchronization with the RF signal being received from the base unit. The low power monitoring mode of the handset unit 20 also is overridden by certain key pushes on the keypad. Once certain keys are pushed, the handset unit 20 is configured in the full ON operate state (the transmitter and receiver in the RF transceiver 230 both turn on) and attempts to establish synchronism with the base unit 10 by transmitting an RF signal to this unit.

With reference to the registration process, this is the process that configures the handset units 20 through 40 for communicating with the base unit 10 or the handset units for communicating with each other. Each of the handset units 20 through 40 must be provided with a security code from the base unit 10 during the registration process in order for subsequent radio frequency communications to take place between the base unit and a handset or between handsets.

If only one handset unit is to be used in conjunction with the base unit 10, no manual registration by the user for the single handset is necessary. The handset unit and the base unit are both shipped from the factory in a default mode wherein a common default security code and a default channel are employed by both of these units. Also while in this mode, the transmitted power level from both the base unit and the handset unit are reduced to and provided at a low power level below the normal operating power level. When the telephone is removed from its shipping carton, typically the user installs a battery in the handset and cradles the handset unit in the base unit for charging this battery. After the battery has been charged for a suitable time, the user removes the handset unit and goes off-hook either in the phone or the intercom mode.

When the user goes off-hook at the handset unit, the cordless telephone recognizes that it is in the default mode and automatically transfers both the security code data and the starting channel data from the base unit to the handset unit, while operating at the low power level. The security code data is generated in the base unit in accordance with the teachings of U.S. Pat. No. 4,736,404 which issued to R. E. Anglikowski et al. on Apr. 5, 1988. The starting channel data is a pseudo-random number seed. This seed, used for generating the starting channel and also random subsequent channels, is generated by the control unit in the base unit in accordance with the assembly language code provided in Appendix 1. The handset unit automatically acknowledges to the base unit when it has received the security code data and the starting channel data. Once this data has been received and acknowledged, both the base unit and the handset unit begin frequency hopping in the manner described in U.S. Pat. No. 5,353,341 which issued to M. E. Gillis et al. on Oct. 4, 1994.

When frequency hopping begins, the transmitted power level is returned to the normal operating power level from the low power level. If subsequent reregistration of the base unit and the handset unit becomes necessary, because of, for example, either the base unit or the handset unit becoming inoperative and having to be replaced, the user may execute the registration process described next herein with reference to FIG. 3, and stop the registration process when only the one handset unit has been registered.

Figure 3:
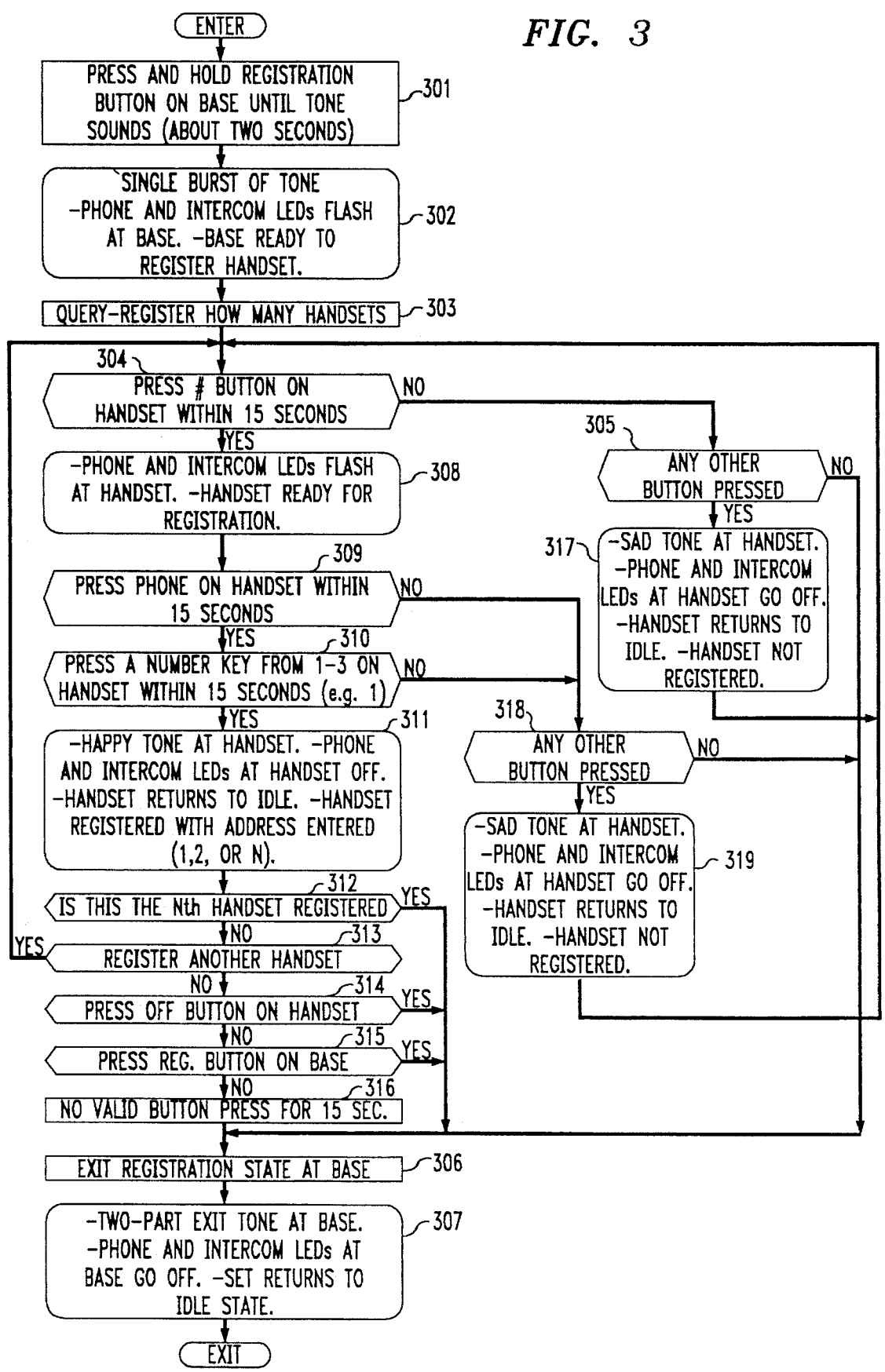
FIG. 3 shows the protocol of the cordless telephone depicting the specific processes executed by both the base unit and the multiple portable units in performing a registration process of the portable units, in accordance with the principles of the present invention.

Referring next to FIG. 3, there is shown the protocol of the cordless telephone depicting the specific processes executed by both the base unit 10 and the handsets 20 through 40 in performing the registration process. The registration process for multiple handset units requires the user to activate a sequence of buttons in the user interface and display 265, shown in FIG. 2, at each handset unit after initiating the registration state at the base unit 10. During this registration process, the base unit 10 transfers common security code data, and also a pseudo-random seed assigned to each handset unit that is registered, to all of the multiple handset units that are registered in the system. The protocol begins at step 301 where registration is initiated at the base unit 10 by actuating a dedicated registration switch which is a part of the interface unit and display 165, shown in FIG. 2. This switch is typically located on the rear of the base unit 10 and is protected from inadvertent activation by either recessing, providing a protective collar around the switch, or other similar measures. Instructions on the registration procedure are easily provided either in a pull-out drawer on the bottom of the base unit 10 or on a stick-on label affixed to the base unit.

Before beginning registration, the base unit and all handset units in the cordless telephone must be in a standby state (i.e., no phone call or intercom call is being initiated or in progress). For registration, the base unit and all handset units go to a predetermined registration communication channel where the handset units are then configured for specific operation with the base unit. This registration communication channel is typically selected at the time of manufacture so that subsequently manufactured and purchased handset units for use within a system will be easily configurable by a user.

To initiate the registration process, a user presses and holds the registration switch or button at the base as in step 301 (for about two seconds) until a burst of tone sounds indicating that the base unit is ready to register handset units. Both PHONE and INTERCOM light emitting diodes (LEDs) in the interface unit and display 165 on the base unit flash in synchrony as in step 302 as long as the base unit is in the registration state. While the base unit 10 is in the registration state, the cordless telephone station (i.e., both the base unit and handset unit) is operating at a low power level below the normal operating power level and no calls can be placed or received from this station.

From step 302, the process advances to step 303. At this step, the user presses a number button in the dial pad on the base unit which is indicative of a number "N" of handset units that the user then wishes to register. With the information provided at this step, the base unit is then informed of how many different pseudo-random number seeds it needs to generate. A different seed is used by the base unit and by each one of the plurality of handset units in generating a starting channel for each one of these units. The base unit is then able to transmit not only its number seed to each handset unit so that these handset units knows which channel to monitor, but also is able to transmit to each handset unit the number seed of each of the other handset units to facilitate these handset units communicating with each other, as explained in detail later herein.

From step 303, the process advances to decision 304. As reflected in this decision, a user must press the # button on a handset unit he or she then wishes to register with the base unit 10. If no action is taken, either at the base unit or at the handset unit within, for example, 15 seconds after the base enters the registration state, the registration state will time out, the base unit returns to the idle state, and the handset units currently in use with the base will remain unaffected. This part of the process is depicted by decision 305 and steps 306 and 307. If the registration button is pressed during the registration process, it acts as a toggle for the base unit to exit the registration state and return to the idle state.

After initiating the registration process and configuring the base unit 10 in the registration state, the user proceeds to register the multiple handset units. Although only three handset units are shown and described, as indicated earlier herein, a greater or lesser number may also be registered in accordance with the principles of this invention and such variation is anticipated.

At the first handset unit to be registered, the user presses the # button on the dialpad to prepare the handset unit to enter registration with the base unit. As reflected in step 308, PHONE and INTERCOM LEDs in the handset unit flash at the same rate as the base unit LEDs to indicate that the handset unit is on the registration communication channel and ready for registration. As indicated in decisions 309 and 310 and step 311, the user presses the PHONE button on the handset unit to establish a communications link with the base unit and also a number key such as the 1 button (represented by handset number 20, for example) on the dialpad to register the handset unit address. The handset unit then gives a "happy tone" and the PHONE and INTERCOM LEDs go off to confirm that this handset unit has been successfully registered. The user may continue to register the remainder of the handset unit s by pressing #, PHONE, 2, for handset 30; by pressing #, PHONE, N, for the last handset N, for example, as depicted in decisions 312 through 315. Each handset unit gives a happy tone as it is successfully registered. If a handset unit is not successfully registered, however, a sad tone is provided at the handset unit, as depicted in decision 305 and step 317 and also decision 318 and step 319.

If the user presses an invalid key at any time on the handset unit being registered, that handset unit gives an error tone and aborts the registration state. However, the base unit remains in its registration state waiting for a valid keypress on any handset unit. If there is no valid keypress within 15 seconds, as in step 316, for example, the base unit also exits the registration state, retaining only successful handset unit registrations.

If a user is unsuccessful in registering any new handset units, the original handset units continue to work with the base unit. When a registration session is initiated, any handset unit previously associated (or registered) with the base unit continues to work with the base unit until at least one handset unit is successfully registered during the new registration session.

When the registration state is exited by the base unit, the flashing base unit LEDs are turned off, a distinct tone sounds at the base unit and the base returns to the idle state. The registration state is exited when one of the following occurs: 1) the user has registered the indicated number "N" of handset units; 2) the user presses the registration button on the base unit (toggles off); 3) the user presses the OFF button on the handset unit; and 4) there is no valid button press during registration for, by way of example, 15 seconds. The handset units have non-volatile memory so that handset registration is not lost when a battery is depleted or during a battery swap.

Once registration of the handset units with the base unit is completed, each handset unit begins to monitor the broadcast channel of the base unit for a signal from either the base unit or any other handset unit attempting to establish communications with another handset unit over this channel. The base unit, in turn, begins to sequentially monitor each one of the channels respectively assigned to the handset units for detecting a signal from a handset unit attempting to establish communications with the base unit.

Figure 5:
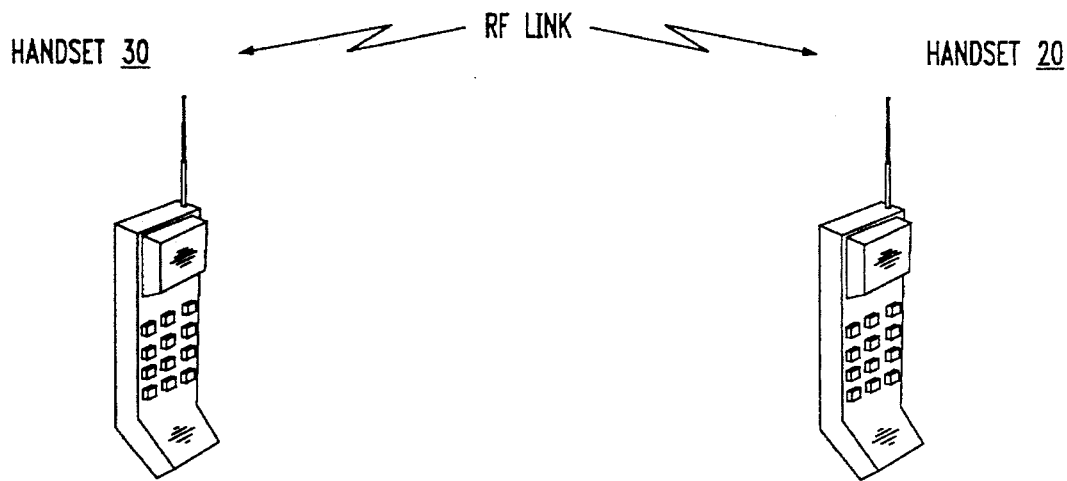
FIG. 5 shows a first and second portable unit arranged to communicate with each other, in accordance with the principles of the invention.

In accordance with the disclosed embodiment, when multiple handset units are registered with a base unit, any one of the system handset units will have the ability to selectively page and use the intercom with another system handset unit or the base unit. Such a communications radio-link is illustrated in FIG. 5 which shows handset unit 30 communicating with handset unit 20. Like the base unit 10, any one of the handset units is able to send a general or broadcast page signal which will be received by each one of the other handset units in the system.

Figure 4:
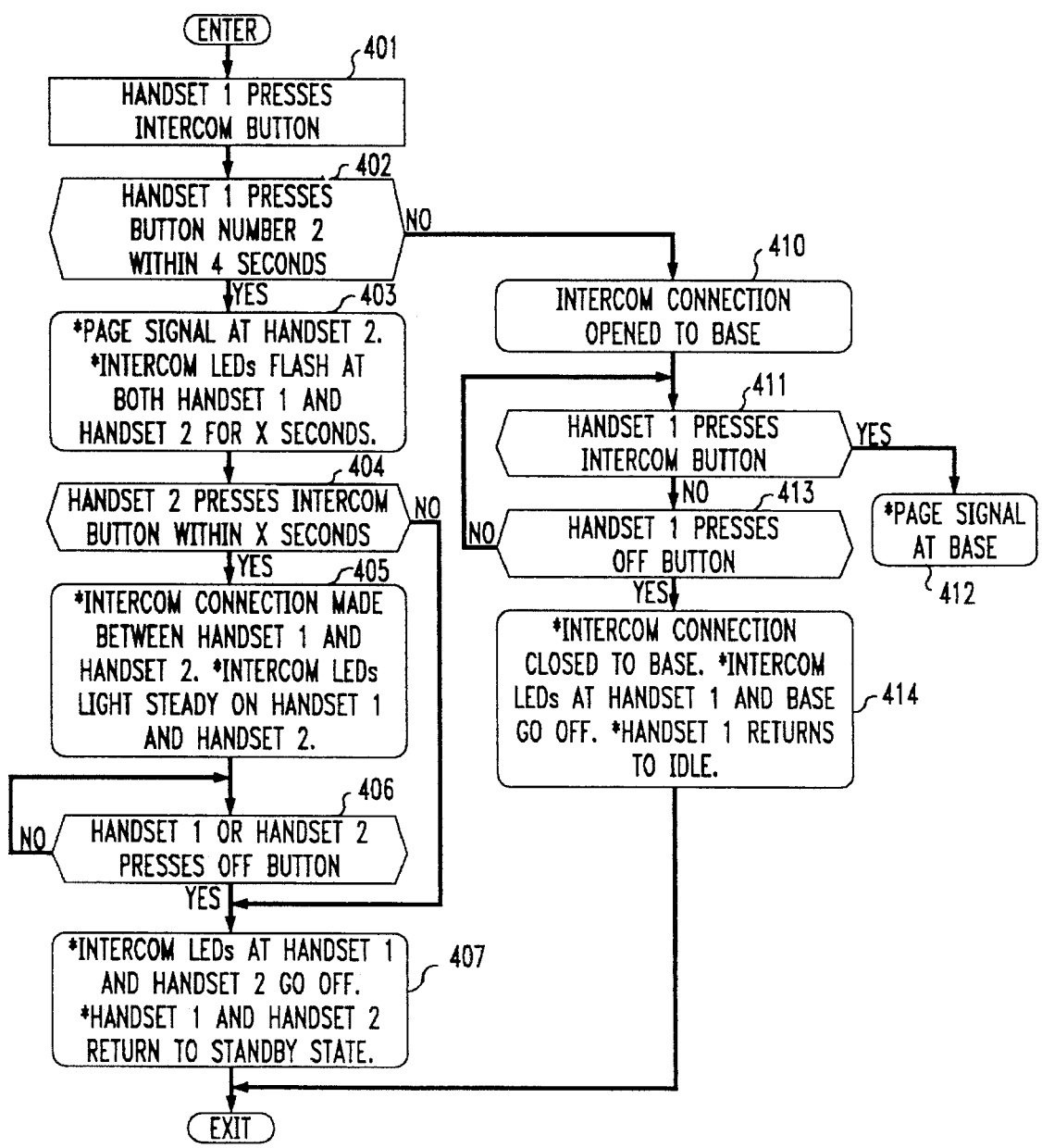
FIG. 4 shows the protocol of the cordless telephone depicting the specific processes executed by both a first portable unit and a second portable unit in establishing communications with each other, in accordance with the principles of the present invention.

Referring next to FIG. 4, there is shown the protocol of the cordless telephone system where a first handset unit is able to page a second handset unit and the second handset unit is able to directly answer the intercom call from the first handset unit.

During the registration procedure, each of the three illustrated registered handset units is given an address of either 1, 2, or 3 (handset 1, handset 2, or handset 3, for example). This assigned address allows a user to selectively page a designated handset unit in the system by pressing the INTCM button followed by the handset address. While the designated handset unit is being signaled, the signaled handset unit can answer by opening the intercom to the initiating handset unit.

The protocol is entered at step 401 where a user at handset 1 may, for example, want to send a page signal to handset 2. To begin the process, the user at handset 1 presses the INTCM button and then 2 on the dialpad of handset 1, as shown in decision 402. This sends a page signal to handset 2 via step 403 and flashes the INTCM LEDs at both handset 1 and 2 for X seconds, where X is typically 15 seconds. If the INTCM button is pressed at handset 2 during the interval that the LED is flashing, the intercom connection is opened between handset 1 and handset 2 (the initiating handset unit and the paged handset unit) as shown in step 405. If the INTCM button is not pressed at the signaled handset unit (i.e., the paged handset unit does not answer), the INTCM LEDs at both handset units go off when the interval times out and the handset units return to the standby state. The initiating handset unit can also abort the intercom request as in step 406 by pressing the OFF button. If a user at another (third) handset unit presses the INTCM button while a handset unit is being paged, or after an intercom connection is already established, that handset unit will get a four-beep busy tone and will be locked out from the intercom.

A handset unit can also open the intercom to the base unit 10 by addressing the base unit in the same way that a handset unit is addressed. This protocol is shown in steps 410, 412 and 414, and decisions 411 and 413. The base unit always has an address of 0 (zero). To intercom directly with the base unit, a user presses the INTCM button and then 0 on the dialpad. If a user at a handset unit presses the INTCM button and does not key in an address within X seconds, where X is typically 15, the default is to open the intercom between the handset unit and the base unit. The INTCM LEDs at the initiating handset unit and the base unit will in this instance go on. After the intercom connection is opened to the base unit, any subsequent press of the INTCM button at the handset unit will send a page signal to the base unit. To close an intercom connection between two handset units, the user at either handset unit presses the OFF button.

The base unit pages the handset units by providing a broadcast page to all registered handset units when the PAGE button is pressed at the base unit. The page signal is sent to all handset units and flashes the INTCM LEDs at the base unit and the handset units for X seconds, where X is typically 15. Any handset unit can answer the page signal and open the intercom connection to the base by pressing the INTCM button while the INTCM LED on the handset unit is flashing. When the connection is opened to the base unit 10, the INTCM LEDs on the handset unit and the base unit go on steady. If another handset unit presses the INTCM button after the connection has already been established, that handset unit gets a four-beep busy tone and is locked out from the intercom. If the INTCM button is not pressed at any of the signaled handset units (i.e., no handset unit answers the page), the INTCM LEDs at the base unit and the handset units go off when the interval times out and the handset units all return to the standby state.

A telephone call received on one handset unit may be transferred to another handset unit registered with the base unit. Because only one handset unit can be on a call with the base unit at a time, the radio communication link between the answering handset unit and the base unit must be released before another handset unit can establish the link and pick up the held call. Whenever the radio communication link between the base unit and a handset unit is released, the base unit returns to monitoring those channels used for respectively initiating communications from the handset units to the base unit. A button on the handset unit allows the user to place the call in a suspended state and release the link so that another handset unit can connect to the call by pressing the PHONE button. The original handset unit is also able to reestablish the link and reconnect to the suspended call by pressing the PHONE button in the event that another handset unit does not pick up the call. To facilitate call handling with multiple handset units, whenever a telephone call is in progress at any handset unit, the phone LEDs on other handset units are configured to blink for indicating that the telephone line is in use.

Communications between the base unit 10 and the handset unit 20 occur in time periods designated as transmission frames. In a frame, the base unit and the handset unit both transmit to each other. A typical transmission frame may be, for example, 5 milliseconds in length and contain time slots for approximately 500 bits of information. In operation, the base unit generally transmits in the first half of each frame or for 2.5 milliseconds and is then reconfigured to receive a signal from the handset unit which transmits in the second half of each frame or for 2.5 milliseconds on the same frequency. The handset unit operates in complementary fashion to the base unit in that it receives in the first half of each frame and is reconfigured to transmit in the second half of each frame. This cyclic frame transmission generates 80 frames in approximately 400 milliseconds with the base unit and handset unit both hopping to and transmitting and receiving on each of the 50 communication channels.

Both the base unit and the handset unit may initiate a call to each other. Channel 51 is the channel used for initiating communications from the handset unit to the base unit. Channel 0 (zero) is the channel used for initiating communications from the base unit to the handset unit. Each handset unit has its own assigned channel 51 provided to it by the base unit at registration, as described later herein. Thus, when the base unit 10 is initiating a call to the handset unit 20, the base unit sends the initialization synchronization pattern on channel 0 for 400 milliseconds. When the handset unit is initiating a call to the base unit, the handset unit also sends this same initialization synchronization pattern but on channel 51 in time periods equal to the second part of each frame for 120 milliseconds. This synchronization pattern comprises a dotting sequence signal, followed by a security code, a barker code and a period in which no information is transmitted as discussed later herein.

The dotting sequence signal is a series of ones and zeros that are provided for enabling the handset unit 20, and also the base unit 10, to align the phase of its receive clock with the phase of the clock providing the incoming signal. When the phase of these clocks is aligned, the handset unit is then able to read in the proper bit boundary the security code and barker code that follow the dotting sequence signal.

When attempting to contact the handset unit, the base unit sends 198 bits of the dotting sequence signal followed by the security code. This security code is a 16-bits random number generated by the base unit and, as earlier indicated, is transferred to the control unit 210 in the handset unit 20 over a low power radio-link during the registration process which registers the multiple handset units used in the system. This shared security code guards against another base unit inadvertently synchronizing with the handset units that are registered with the system.

The security code is followed in the initialization synchronization pattern by the barker code. This barker code is a fixed predetermined eight-bit pattern which provides a position reference in a frame for aligning a frame clock of the receiver in the handset unit with the frame clock of the transmitter in the base unit. This permits the handset unit 20 to reestablish frame sync or frame phase with the base unit 10 after the handset unit has been turned off during its low power monitoring mode of operation. When aligning with the handset unit 20, a frame clock in the receiver of the base unit 10 must similarly be aligned with a frame clock of the transmitter in the handset unit.

After the base unit 10 transmits the security code and barker code in the initialization sync pattern, no additional information is sent by the base unit in each frame for a time period equal to 30 bits. A delay is provided in this time period for certain internal processing to occur, including, for example, the reconfiguring of the frequency synthesizer 150 for receiving the initialization sync pattern from the handset unit 20.

Once the alignment of the frame position of the handset unit receiver with the base unit transmitter has been achieved, synchronization for the handset unit is established. Similarly, the alignment of the frame position of the base unit receiver with the handset unit transmitter also establishes synchronization for the base unit.

Figure 6:
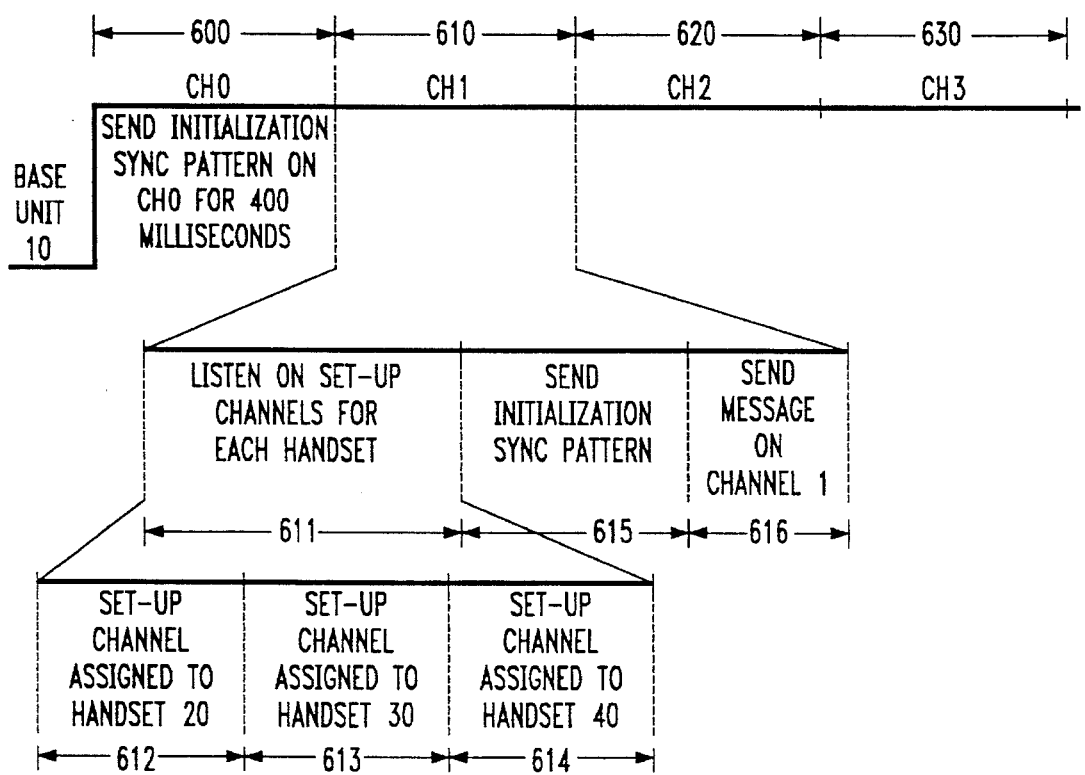
FIG. 6 shows a timing diagram for illustrating the operation of the base unit in the cordless telephone system in providing an initializing signal for establishing communications with either one of the plurality of portable units, in accordance with the principles of the present invention.

Referring now to FIG. 6, there is shown the timing diagram for illustrating the operation of the base unit 10 in the cordless telephone system in providing an initializing signal for establishing communications with either one of the handset unit s 20, 30 or 40. As earlier indicated herein, a handset unit may similarly operate in the manner of the base unit and also generate an initializing signal. An initialization sync pattern from the base unit 10 is transmitted in frame position 600. This initializing sync pattern is a broadcast signal and provides a means for the base unit to activate the handset units to a full ON operating condition from the minimum power operating state.

When there is an incoming call or a press of the page button on the base unit, the base unit begins transmitting a dotting pattern on its communication channel 0 in frame position 600 for 400 milliseconds. The pseudo-random number seed for this channel 0 is provided to each of the handset units during the registration procedure. Each handset unit therefore monitors this channel to detect any attempts by the base unit to establish communications. When the base sends the initialization sync pattern on channel 0 in frame position 600, each handset unit within the reception range of this base unit wakes up or cycles to the on state and moves on to channel 1 which is shown in frame position 610. Since the handset units have the seed for channel 0, they are thus able to move with the base unit to its subsequent channels, for example, channels 1, 2 and 3, in the frequency hopping cycle until communication between a handset unit and the base unit is established. The base unit and the handset units all use the same algorithm to generate the list of communication channels used in each of the frequency hopping cycles.

Once the base unit 10 moves to channel 1 in frame position 610, a number of processing steps in the base unit are performed. First, the receiver in transceiver 130 in base unit 10 is configured to listen on the starting or set-up channel for each handset unit in position 611 for approximately 35 milliseconds each. Thus, as illustrated in positions 612 through 614, the receiver shifts from listening for dotting on the starting channel 51 assigned to handset 20, to listening for dotting on the starting channel 51 assigned to handset 30 to finally listening for dotting on the starting channel 51 assigned to handset 40. Next the transmitter in transceiver 130 is configured for transmitting the dotting or initialization sync pattern in the frame position 615. This time for this signal is approximately 85 milliseconds. Finally, in frame position 616, the opcode message, for example ring or page, is sent to the handset units while on channel 1. If no response is received from a handset unit while the base unit is on channel 1, the base unit moves on to channel 2. The processing steps executed on channel 1 are again executed on channel 2. If no response is received from a handset on channel 2, the base unit moves on to channel 3, and subsequent channels, repeating the same steps until it has moved among all 173 channels. Then the process starts again and continues until a handset unit respond or the ringing signal or paging signal is discontinued. Each of the subsequent channels are identical to channel 1 in that the base unit first listens on the set-up channels for each handset unit, send the initialization sync pattern and then send the opcode message on the channel.

As additional channels are necessary to be accessed before a response from a handset unit is received by the base unit, these additional channels are also selected from the seed of channel 0 with each proceeding channel being the basis for selecting the subsequent channel. This generation technique is equivalent to a listing of 173 channels with each channel always appearing at the same position in the list.

In order to get a response on one of the set-up channels from a handset unit, a person at a handset unit must go off-hook in responding to the ring or page signal. Otherwise the base unit does not receive a signal from a handset unit. Once the base unit receives a dotting signal from either one of the handset units, it attempts to establish communications just with that handset unit on its set-up channel and stops sending the dotting signal on its broadcast channel.

Once a handset unit has responded to the base unit and the base unit has detected this response and established synchronism with the handset unit, communications between the base unit and the handset units are provided in the manner of U.S. Pat. No. 5,353,341 which issued to M. E. Gillis on Oct. 4, 1994.

Figure 7:
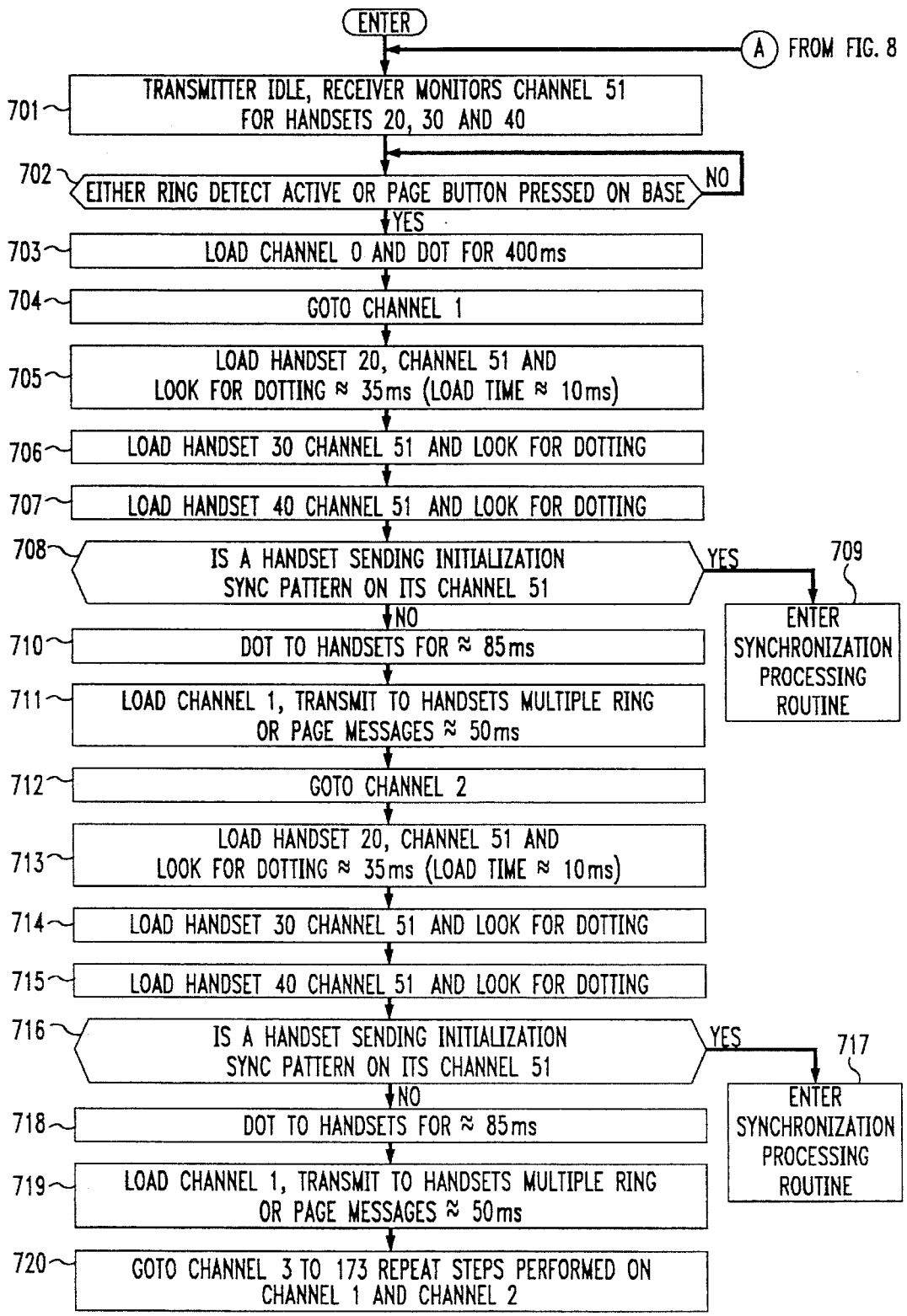
FIG. 7 shows in flow chart form the operation of the cordless telephone with the desired functionality including criterion for the base unit in initiating a call set-up with the portable unit, in accordance with the principles of the present invention.

Referring next to FIG. 7, there is shown in flow chart form the operation of the cordless telephone with the desired functionality including criterion for the base unit in initiating a call set-up with the handset unit as shown in FIG. 6. The functions provided by control unit 110 are advantageously determined by a process or program stored in read only memory (not shown). The process is entered at step 701 where the base unit transmitter is idle and its receiver is monitoring each set-up channel, channel 51, for each one of the handset units. Once a ring is detected or page button is pressed on the base unit, the process advances to step 703 where the base unit sends a dotting signal for 400 milliseconds. In step 704 the base unit 10 moves to channel 1. While on channel 1, the handset unit loads the handset's set-up channels for each of the handset units in steps 705, 706 and 707 while looking for dotting on each of these channels. If a sync pattern is detected on one of the handset unit channels, the process advances to a synchronization processing routine shown as step 709 and described in detail later herein with reference to FIG. 8.

If a handset initialization sync pattern on its set-up channel is not detected, then the base unit sends dotting to the handset units in step 710 and a ring or page message in step 711. Next the base unit moves to channel 2 in step 712 and the processing steps in steps 713, 714, 715, 718, 719 and decision 716 are executed, these steps and the decision being essentially a repeat of the steps and decision executed for channel 1. If no response from a handset unit is received while the base unit is on channel 2, the process repeats the steps and decisions in channels 3 to 173.

Handset units may advantageously be configured to communicate with other handset units, in accordance with the disclosed embodiment. A first handset unit, for example, handset unit 20 can have its circuitry, i.e., its TDD 220 reconfigured such that this circuit will cause the handset unit 20 to transmit and receive in the same manner as the base unit 10. Thus, if handset unit 20 attempts to communicate with, for example, handset unit 30, handset unit 20 will send on channel 0 a dotting signal for 400 milliseconds during which all handset units wake-up and go to channel 1. Once the handset unit 20 moves to channel 1, like the base unit 10 illustrated in frame position 610, a number of processing steps in this handset unit are performed.

Since the handset unit 20 is attempting to communicate with handset unit 30, the handset unit 20 sends a selective page opcode message to handset unit 30 and only listens to the set-up channel designated for this handset unit. In this regard it is different from the base unit 10 which sends a broadcast page opcode message and listens to each one of the set-up channels for each handset unit. Otherwise the processing steps in the handset unit for this frame position is identical to that of the base unit where an initialization sync pattern and the opcode message are also sent on this and any necessary subsequent channels.

Once the two handset units establish a radio frequency link, the hopping list that they use is generated from the channel that was used to synchronize on by these handset units. Thus, in this example, handset unit 20 and handset unit 30 use the set-up channel and communication channels assigned to handset unit 30. These communication channels are loaded into both TDD circuits in these handset units and accessed at the 5MS hopping rate. When one of the 50 channels loaded into the TDD is found to be unusable due to interference, etc., it is replaced with the next channel generated from a pseudo-random seed, as earlier described herein or generated by the pseudo-random generator as described in U.S. Pat. No. 5,323,447 which issued to M. E. Gillis et al. on Jun. 21, 1994.

While a base unit and handset unit are communicating with each other, occasionally, it is desirable to be able to switch the call coming through the base unit to another handset unit. In order to communication with another handset unit, the initial handset unit must discontinue the communications link it has with the base unit. In order to accomplish such transfer, the user presses a transfer key on the handset unit which activates a message transmission from the handset unit to the base telling the base to disengage the communication link, but keep the off-hook relay open. A press of the phone button on any of the handset units would cause any of the handset units to go off-hook and be connected to the call. The user, at this time, is able to page another handset unit to tell the person at that handset unit that there is a call on the telephone line. The paged person is then able to press his or her phone button and his or her handset unit establishes synchronism with the base unit and connects this handset unit to the telephone line.

After the user has presses the transfer key, the user may need to page a person at one of the other handset units. To do this, the user next presses the intercom button and the handset unit is configured in the manner of the base unit as described earlier herein for contacting a selected one of the other handset units.

Once a handset unit is communicating with another handset unit, the base unit may then also communicate with the remaining free handset unit. Since handset units communicating with each other move away from the broadcast channels once a telecommunication link has been established between them, the base unit and the remaining handset unit may advantageously then use the broadcast channels to establish another communication link between itself and the remaining free handset unit.

Figure 8:
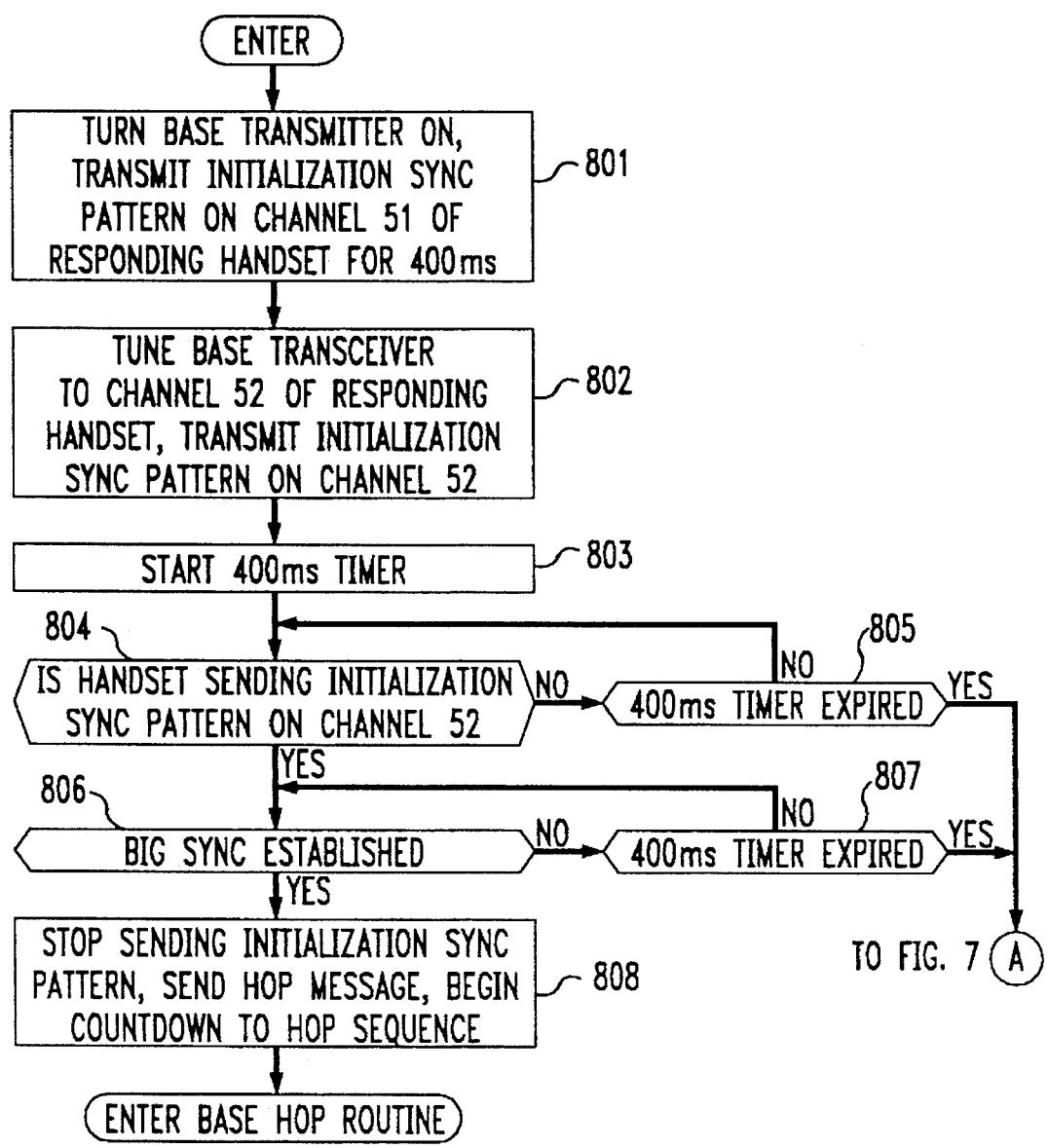
FIG. 8 shows a flow chart illustrating the operation of the cordless telephone with the desired functionality including criterion for the base unit in establishing synchronism with the portable unit, in accordance with the principles of the present invention, Throughout the drawing, the same element when shown in more that one figure is designated by the same reference numeral.

Referring next to FIG. 8, there is shown a flow chart illustrating the operation of the cordless telephone with the desired functionality including criterion for the base unit in establishing synchronization with a handset unit. The functions provided by control unit 110 are advantageously determined by a process or program stored in read only memory (not shown). The process is entered at step 801 where the base unit transmitter is turned on and the initialization sync pattern is transmitted on channel 51 for 400 milliseconds. From step 801, the process advances to step 802 wherein the base transceiver (transmitter and receiver) is tuned to channel 52. The transmitter again transmits the initialization sync pattern on this channel and the receiver begins to monitor this channel for receipt of the initialization sync pattern expected to be provided by the handset unit on this channel.

From step 802, the process advances to step 803 where a 400 millisecond timer is started. The process then advances to decision 804 where a determination is made as to whether the handset unit is sending the initialization sync pattern as expected on channel 52. If this sync pattern is not being received, the process advances to the decision 805 where a determination is made as to whether the 400 millisecond timer has expired. If this timer has expired, the attempt to establish communications with the handset unit is terminated and the process returns to the step 701 in FIG. 7 where it again monitors channel 51. If the timer has not expired in decision 805, the process returns to decision 804 and continue to look for the initialization sync pattern on channel 52. If in decision 804, it is found that the handset unit is sending its initialization sync pattern on channel 52, the process advances to decision 806.

At decision 806, a determination is made as to whether BIG SYNC is established in the base unit. If not, the process advances to decision 807 where the 400 millisecond timer is examined once again. If this timer has expired, the process returns to step 701 in FIG. 7 and the call set-up attempt is discontinued. If the timer has not expired, the process returns to decision 806 and determines once again whether BIG SYNC has been established. When BIG SYNC is established, the process advances to step 808 where the base unit stops sending its initialization sync pattern, sends a message to the handset unit to cause it to also stop sending its sync pattern. The base unit also sends the hop message to the handset unit in this step and begins its countdown to the time at which the frequency hopping sequence is to start. Once the countdown sequence ends, the call setup routine is exited and the process enters the base hop routine.

Various other modifications of this invention are contemplated and may obviously be resorted to by those skilled in the art without departing from the spirit and scope of the invention as hereinafter defined by the appended claims.

APPENDIX ONE

```
                GEN_LIST        Generate a maximal length pseudorandom list of
                                channels.

*                                                           PORT
*                                                           bits
*                                                           ram
*                       rand_num,ran_seed
*                                                           equates
*                       MSK         equ         $b8
get_seed
*
              lda       ACLR                    Gather 8 bits.
              sta       ran_seed                Start at one.
              rts
gen_list
              lda       ran_speed               ;
              brclr     0,ran_seed,gen_1_1
              lsra
              eor       # MSK
              bra       gen_1_2
gen_1_1
              lsra
gen_1_2
              sta       ran_seed
              sta       rand_num
gen_1_3
              lda       rand_num
              cmp       # MAX_FREQ
              bhi       gen_list                ; Branch if Acca.> memory. OK
```

APPENDIX ONE-continued

| | |
|---|---|
| GEN_LIST | Generate a maximal length pseudorandom list of channels. |
| rts | |

We claim:

1. A cordless telephone including a base unit connectable to a telephone line and a plurality of handset units for communicating with the base unit over any one of a plurality of communication channels in a frequency hopping system, the base unit including a first transmitter and a first receiver for respectively transmitting to a second receiver and receiving from a second transmitter in each of the plurality of handset units, the cordless telephone comprising:

means for configuring both the base unit and the plurality of handset units on a predetermined channel for registering each one of the plurality of handset units for operation with the base unit;

means for reducing the transmitted power from said first transmitter and said second transmitter from a first level to a second reduced level;

means for generating in the base unit data indicative of both a security code and a starting channel for each one of the plurality of handset units; and means for transmitting in said first transmitter to each one of the plurality of handset units data indicative of both the security code and the starting channel for each one of the plurality of handset units.

2. The cordless telephone of claim 1 wherein the generating means further generates data indicative of a starting channel for the base unit and said transmitting means transmits this data to each one of the plurality of handset units.

3. The cordless telephone of claim 2 wherein the means for generating the starting channel data includes means for generating a plurality of different pseudo-random number seeds, each one in the plurality of different pseudo-random number seeds being respectively assigned to the base unit and to each of the plurality of handset units for generating different starting channels for the base unit and each of the plurality of handset units.

4. The cordless telephone of claim 3 wherein each one in the plurality of different pseudo random number seeds is used as a basis for generating a first subsequent pseudo random number, said first subsequent pseudo random number being used to generate a first subsequent communication channel for use by the handset unit in communicating with the base unit during the frequency hopping cycle.

5. The cordless telephone of claim 1 wherein the generating means further includes means for pseudo randomly selecting from the plurality of communication channels a different starting channel for each one of the plurality of handset units, each handset unit providing initial communications with the base unit over its selected starting channel.

6. The cordless telephone of claim 5 wherein the selecting means includes means for generating a plurality of pseudo random number seeds, each number seed being used by the base unit and one of the plurality of handset units for generating the starting channel for said one of the plurality of handset units.

7. The cordless telephone of claim 6 wherein the pseudo random number seed is used as a basis for generating a first subsequent pseudo random number, said first subsequent pseudo random number being used to generate a first subsequent communication channel for use by the handset unit in communicating with the base unit during the frequency hopping cycle.

8. The cordless telephone of claim 7 wherein each subsequent pseudo random number generated by a preceding pseudo random number is in turn used as a basis for generating its subsequent pseudo random number, each pseudo random number being used to generate a corresponding communication channel for use by the handset unit in communicating with the base unit during the frequency hopping cycle.

9. A method of configuring a plurality of handset units for operating with a base unit in a frequency hopping system, the base unit including a first transmitter and a first receiver for respectively transmitting to a second receiver and receiving from a second transmitter in each of the plurality of handset units, the method comprising the steps of:

configuring both the base unit and the plurality of handset units on a predetermined channel for registering each one of the plurality of handset units for operation with the base unit;

reducing the transmitted power from said first transmitter and said second transmitter from a first level to a second reduced level;

generating in the base unit data indicative of both a security code and a starting channel for each one of the plurality of handset units; and transmitting in said first transmitter to each one of the plurality of handset units data indicative of both the security code and the starting channel for each one of the plurality of handset units.

10. The method of claim 9 wherein the generating step further includes the step of generating data indicative of a starting channel for the base unit and said transmitting step further includes the step of transmitting the data to each one of the plurality of handset units.

11. The method of claim 10 wherein the starting channel data generating step includes the step of generating a plurality of different pseudo-random number seeds, each one in the plurality of different pseudo-random number seeds being respectively assigned to the base unit and to each of the plurality of handset units for generating different starting channels for the base unit and each of the plurality of handset units.

12. The method of claim 9 wherein the generating step includes the step of selecting in the base unit in a pseudo randomly manner a different starting channel from the plurality of communication channels for each one of the plurality of handset units, each handset unit providing initial communications with the base unit over its selected starting channel.

13. The method of claim 12 wherein the selecting step includes the step of generating a plurality of pseudo random number seeds, each number seed being used by the base unit and one of the plurality of handset units for generating the starting channel for said one of the plurality of handset units.

14. The method of claim 13 wherein the pseudo random number seed is used as a basis for generating a first subsequent pseudo random number, said first subsequent pseudo random number being used to generate a first subsequent communication channel for use by the handset unit in communicating with the base unit during the frequency hopping cycle.

15. The method of claim 14 wherein each subsequent pseudo random number generated by a preceding pseudo random number is in turn used as a basis for generating its subsequent pseudo random number, each pseudo random number being used to generate a corresponding communication channel for use by the handset unit in communicating with the base unit during the frequency hopping cycle.

* * * * *